May 17, 1949. J. K. CHRISTIE 2,470,143
POCKET FLIGHT POSITION INDICATOR
Original Filed March 23, 1944 2 Sheets-Sheet 1
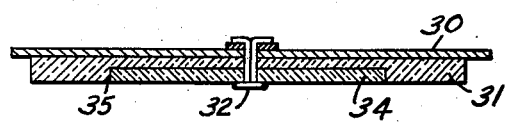
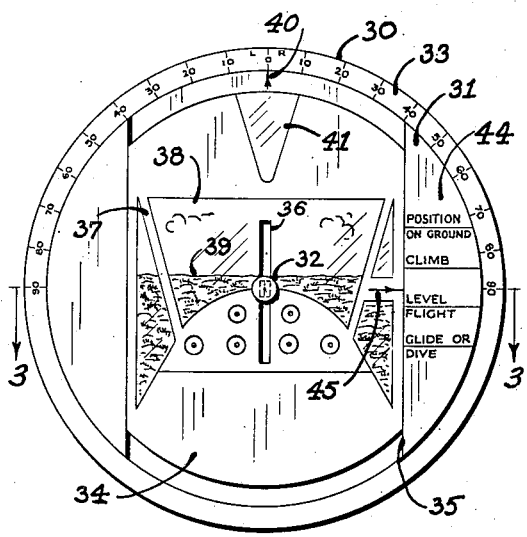
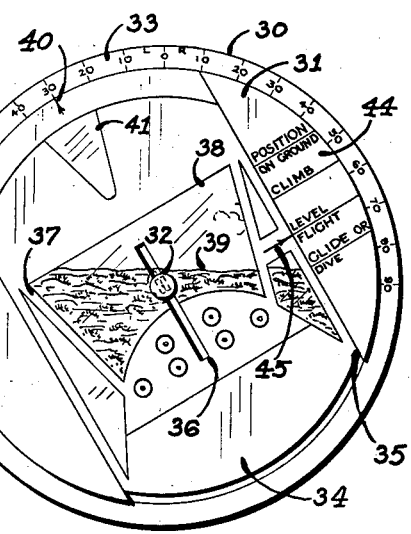
INVENTOR.
John K. Christie May 17, 1949.  J. K. CHRISTIE  2,470,143
POCKET FLIGHT POSITION INDICATOR
Original Filed March 23, 1944  2 Sheets-Sheet 2

INVENTOR.
John K. Christie
BY
ATTORNEY

Patented May 17, 1949

2,470,143

UNITED STATES PATENT OFFICE 2,470,143

POCKET FLIGHT POSITION INDICATOR

John K. Christie, New City, N. Y.

Substituted for abandoned application Serial No. 527,767, March 23, 1944. This application October 17, 1946, Serial No. 703,765

5 Claims. (Cl. 35—12)

This invention relates to new and useful improvement in a flight position indicator.

This is a substitute for my abandoned application, filed on March 23, 1944, Serial Number 527,767.

More specifically, the invention proposes an indicator for the student to familiarize him with the relative appearance of the horizon in relation to the cabin windows in various positions of the plane. The improved indicator is capable of indicating the vertical position of the horizon for various positions of climb, level flight or dive, and oblique positions of the horizon for various bankings of the plane.

The invention proposes to characterize the new flight position indicator by the fact that it is composed of a pair of discs axially, pivotally connected with each other, one of said discs having a horizon and an angular distance scale thereon, and the other of said discs having a pilot's view picture of said horizon and an angle indicator working over said scale to give tilting horizon indications.

The invention further contemplates the provision of means for moving said pilot's view picture radially of said discs to give height horizon indications.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a front elevational view of a flight position indicator constructed in accordance with this invention.

Fig. 2 is an elevational view similar to Fig. 1 but illustrated with the parts in a different position.

Fig. 3 is a horizontal sectional view taken on the line 3—3 of Fig. 1.

Figure 4:
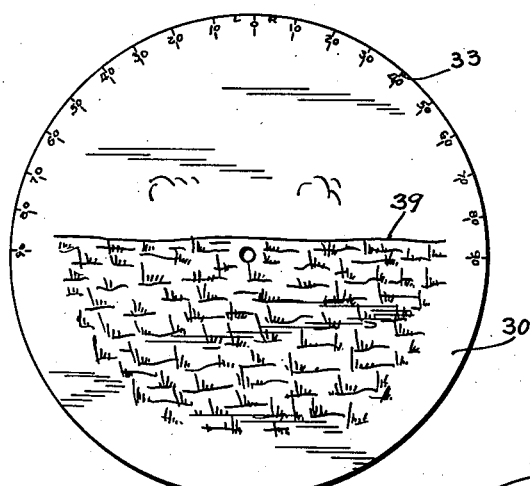
Fig. 4 is a perspective view of one of the discs of the flight indicator.
Figure 5:
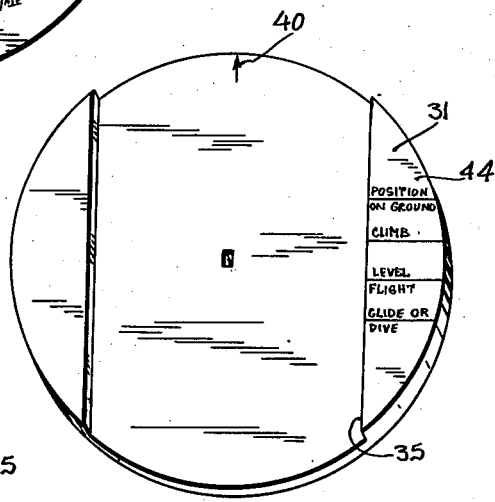
Fig. 5 is a perspective view of the other disc of the flight indicator.
Figure 6:
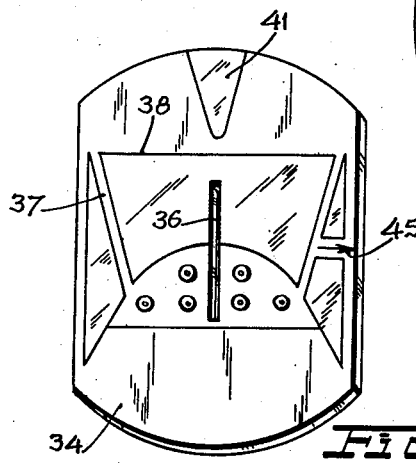
Fig. 6 is a perspective view of the shiftable section of the flight indicator.

The flight position indicator, according to this invention, includes a pair of discs 30 and 31 axially pivotally connected by a staple 32. The disc 30 is of opaque material and slightly larger than the disc 31 so that it has a projecting flange portion upon which the angular distance banking scale 33 is imprinted. The disc 31 is made of transparent material.

The disc 31 has a separate section 34 which is vertically slidably mounted in a groove 35 formed in the main section of the disc 31. The shiftable section 34 is formed with a vertical slot 36 through which the staple 32 projects. The shiftable section 34 is imprinted with indicia 37 to represent the pilot's view of the cockpit, and windows 38 thereof. The back disc 30 is imprinted with indicia to represent the sky, earth and the horizon 39 therebetween, which may be viewed through the disc 31 and the windows 38. The disc 30 is provided with an arrow 40 working over the banking scale 33. The shiftable member 34 has a transparent section 41 so that the arrow 40 is always viewable even though the section 34 is shifted upwards over the arrow 40.

The disc 31 has a vertical position scale 44 located on one side to give level flight, glide, or dive, etc. An arrow 45 is imprinted on the shiftable section 34 and is cooperative with the scale 44.

The operation of this invention is as follows: The student may shift the section 34 so that the arrow 45 indicates various positions along the scale 44 to indicate vertical flight. At the same time the disc 31 may be turned relative to the disc 30 to give positions of the horizon during the banking. The banking angle may be read from the scale 33 by viewing the position of the arrow 40.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A flight position indicator having a pair of superimposed concentric discs formed with concentric aligned openings, the bottom one of which is formed with an indicia adapted to represent sky, earth and the horizon therebetween; and the other one of which is transparent and formed with a groove in which a section, imprinted with indicia to represent the pilot's view of the cockpit and windows thereof, through which the horizon may be viewed, is slidably disposed, and means for connecting said discs and section together so that the top disc may be rotated relative to the horizon while the section is simultaneously moved radially thereof, comprising a staple passing through an elongated slot formed in said section in an aligned position with said concentric openings and through said concentric openings forming an integral movable unit of said discs and section.

2. A flight position indicator having a pair of superimposed concentric discs formed with concentric aligned openings, the bottom one of which is formed with an indicia adapted to represent sky, earth and the horizon therebetween; and the other one of which is transparent and formed with a groove in which a section, imprinted with indicia to represent the pilot's view of the cockpit and windows thereof through which the horizon may be viewed, is slidably disposed, and means for connecting said discs and section together so that the top disc may be rotated relative to the horizon while the section is simultaneously moved radially thereof, comprising a staple passing through an elongated slot formed in said section in an aligned position with said concentric openings and through said concentric openings forming an integral movable unit of said discs and section, said groove being equal in depth to the thickness of said section so that the top faces of said section and top disc are flush.

3. A flight position indicator having a pair of superimposed concentric discs formed with concentric aligned openings, the bottom one of which is formed with an indicia adapted to represent sky, earth and the horizon therebetween; and the other one of which is transparent and formed with a groove in which a section, imprinted with indicia to represent the pilot's view of the cockpit and windows thereof through which the horizon may be viewed, is slidably disposed, and means for connecting said discs and section together so that the top disc may be rotated relative to the horizon while the section is simultaneously moved radially thereof, comprising a staple passing through an elongated slot formed in said section in an aligned position with said concentric openings and through said concentric openings forming an integral movable unit of said discs and section, said slot being extended parallel to said groove permitting a free movement of said section in said groove.

4. A flight position indicator having a pair of superimposed discs formed with concentric aligned openings, the lowermost of the discs being formed of opaque material and imprinted on its face adjacent the topmost disc with an indicia representing sky, earth and the horizon therebetween, the topmost of the discs being formed of transparent material permitting the indicia of the lowermost disc to be viewed therethrough and having a groove extending diametrically thereacross, a member slidably disposed in said groove and imprinted with indicia representing the pilot's view of the cockpit and windows thereof through which the horizon may be viewed, said member being formed with an elongated slot extended parallel to said groove and aligned with the concentric aligned openings of the discs, and a staple passing through said elongated slot of said member and the concentric aligned openings of the discs connecting the discs and said member together, whereby said member may be shifted radially in said groove and the discs may be rotated relative to each other, the lowermost of the discs being larger than the topmost disc forming a flange portion which surrounds the topmost disc, said flange portion being imprinted on its top face with a banking scale, the topmost of the discs being provided within said groove with an arrow registering with said banking scale in the various turned positions of the discs relative to each other, and transparent means on said member permitting said arrow to be viewed in all shifted positions of said member in a direction toward said arrow.

5. A flight position indicator having a pair of superimposed discs formed with concentric aligned openings, the lowermost of the discs being formed of opaque material and imprinted on its face adjacent the topmost disc with an indicia representing sky, earth and the horizon therebetween, the topmost of the discs being formed of transparent material permitting the indicia of the lowermost disc to be viewed therethrough and having a groove extending diametrically thereacross, a member slidably disposed in said groove and imprinted with indicia representing the pilot's view of the cockpit and windows thereof through which the horizon may be viewed, said member being formed with an elongated slot extended parallel to said groove and aligned with the concentric aligned openings of the discs, and a staple passing through said elongated slot of said member and the concentric aligned openings of the discs connecting the discs and said member together, whereby said member may be shifted radially in said groove and the discs may be rotated relative to each other, the lowermost of the discs being larger than the topmost disc forming a flange portion which surrounds the topmost disc, said flange portion being imprinted on its top face with a banking scale, the topmost of the discs being provided within said groove with an arrow registering with said banking scale in the various turned positions of the discs relative to each other, and transparent means on said member permitting said arrow to be viewed in all shifted positions of said member in a direction toward said arrow, said transparent means comprises a transparent section on said member aligned with said arrow.

JOHN K. CHRISTIE.

REFERENCES CITED

The following references are of record in the file of this patent:

UNITED STATES PATENTS

| Number | Name | Date |
|---|---|---|
| 554,101 | Yaggy | Feb. 4, 1896 |
| 1,285,038 | Chance | Nov. 19, 1918 |
| 1,835,777 | Hennegan | Dec. 8, 1931 |
| 1,873,595 | Johnson | Aug. 23, 1932 |
| 2,332,218 | Harris | Oct. 19, 1943 |
| 2,395,838 | Beishline | Mar. 5, 1946 |